Patented Mar. 3, 1953

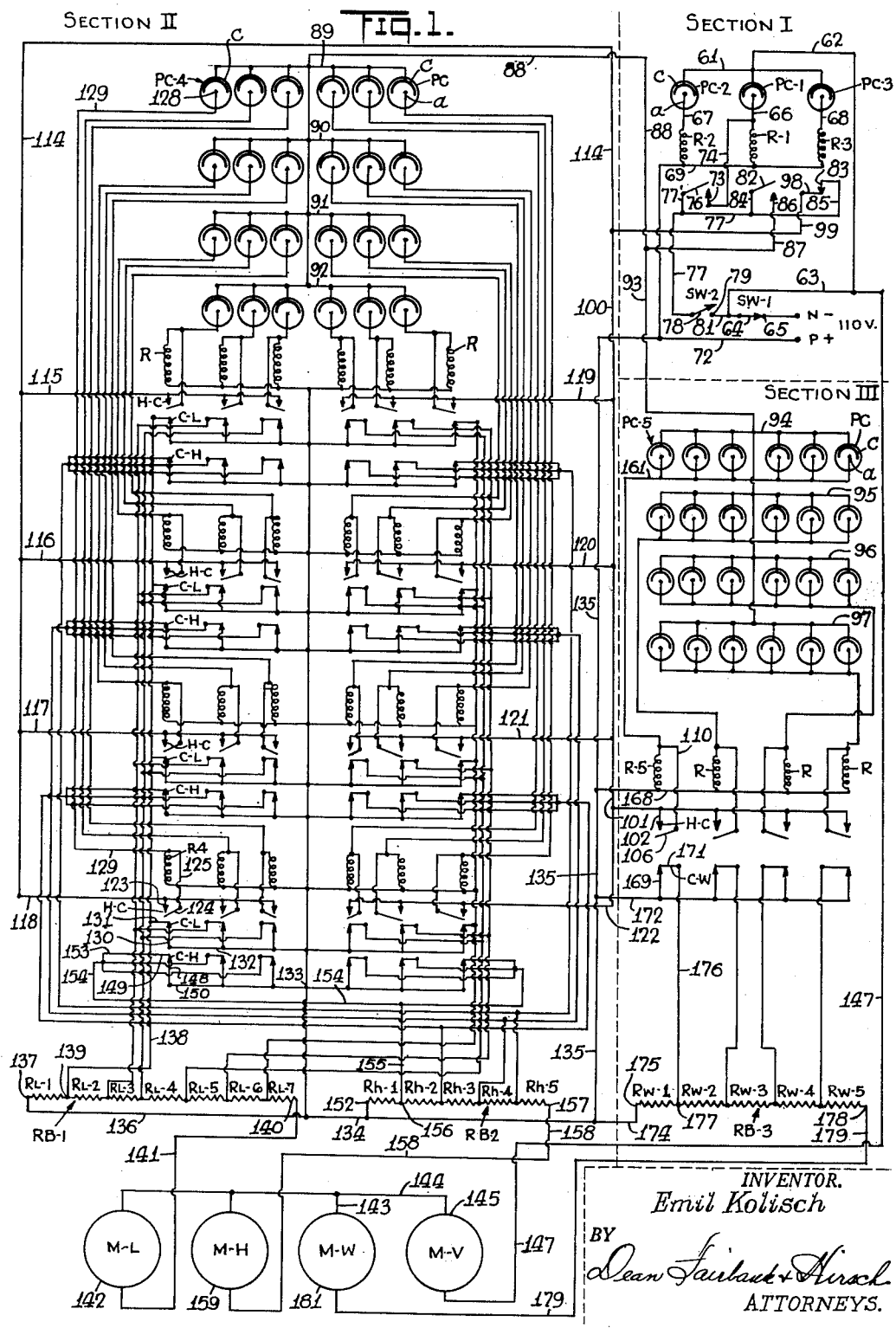

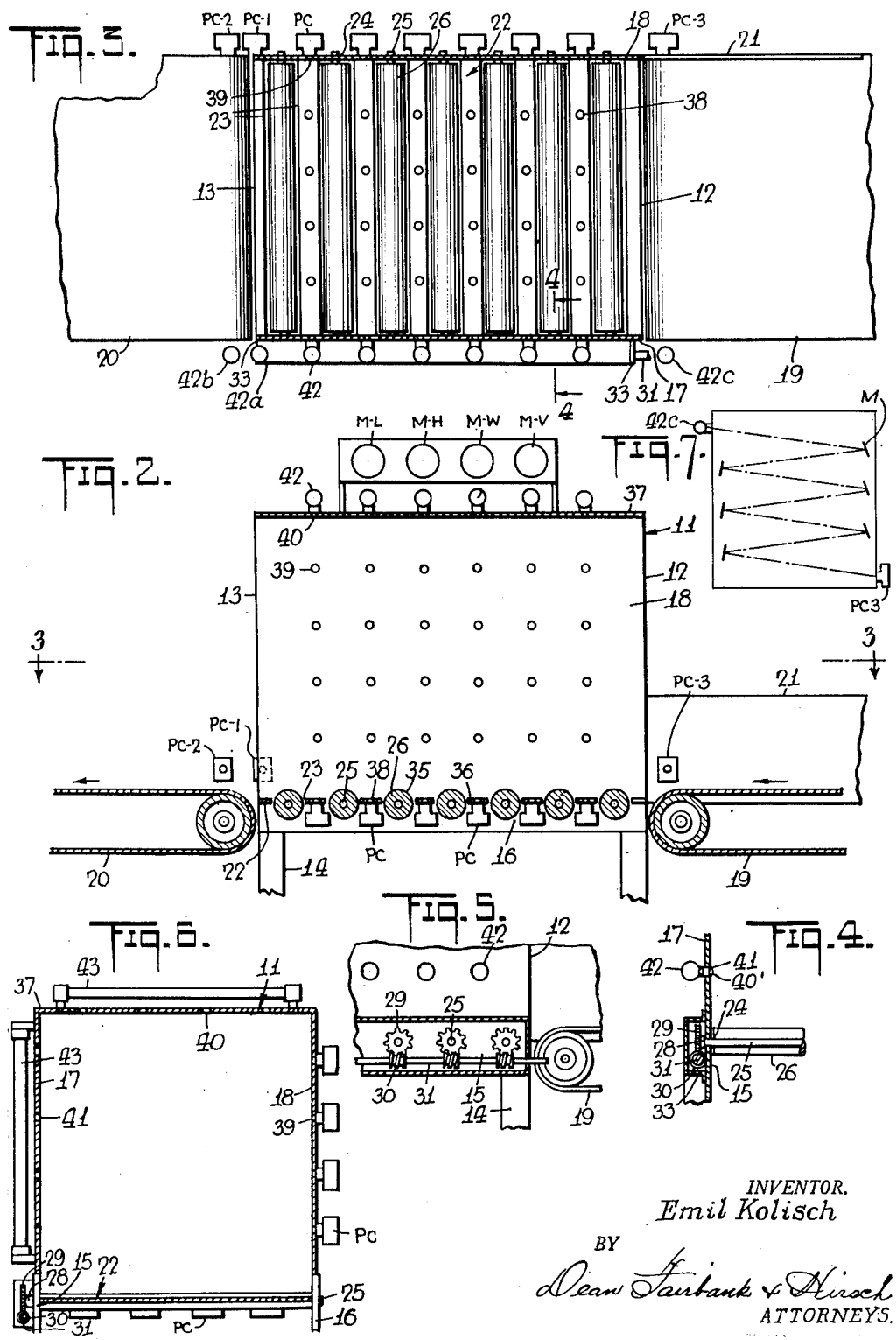

2,630,043

UNITED STATES PATENT OFFICE 2,630,043

CLASSIFYING EQUIPMENT FOR DETERMINING THE DIMENSIONS OF OBJECTS

Emil Kolisch, New York, N. Y., assignor, by mesne assignments, of one-half to Continental Silver Co. Inc., New York, N. Y., a corporation of New York Application September 27, 1947, Serial No. 776,529

15 Claims. (Cl. 88—14)

The present invention is shown exemplified in a method and equipment for effecting dimensional classification, such as by length, width, height, area, volume or the like, and in certain broader aspects is applicable more generally for determining the product of a number of factors.

Various carriers including railroad, steamship and air lines, post office, express and other delivery service organizations, as well as factories, stores and warehouses may have occasion to grade a large number of objects or packages according to overall length, height or width or according to some function as for instance the product of some or all of such gradings for area or volume classification. This is a time-consuming and costly job where the dimensions are measured by rule or tape and the length and width, or length, width and height of each object or package are individually multiplied, whether with or without resort to multiplication tables. The cost and annoyance of ascertaining the volume or other classification of the object is such that the carrier must generally rely on the consignor's estimate of the same which is frequently too low, with consequent loss to the carrier in the numerous cases where that estimate is the basis of shipping charges.

It is accordingly among the objects of this invention to provide a simple, expeditious and reliable method and correspondingly simple equipment with relatively few moving parts, not apt to become deranged, that is easy to operate at relatively high speed with the need for but little supervision, automatically to classify an object or package, no matter how irregular the shape thereof, according to the volume or function of one or more of its dimensions, without the need for manually measuring the same or for doing calculations of any sort.

Another object is to provide a method and equipment whereby the product of a plurality of factors generally may be expeditiously and reliably ascertained, without need for calculations of any sort and without resort to gearing or complicated mechanism.

According to the invention, light projected upon a light sensitive screen is modulated by the interposition of the object to be classified, to cast a shadow upon said screen determined by the dimensions of said object. The characteristics of the shadow are utilized for corresponding classification indication apart from said screen.

While each of the three dimensions of the object or package could be determined by casting corresponding shadows, one for the base, one for the side and one for the end and such practice is within the scope of the present invention from its broader aspects, in one practical embodiment of the invention herein shown, the width of the object is determined from a horizontal shadow, the height from a vertical shadow and the length from either one or the other of said shadows, illustratively the vertical shadow.

In the particular embodiment shown in the drawings, a classifying chamber is provided through which packages are propelled, as for instance, by driven rollers on the floor of the chamber. A plurality of light sensitive devices such as photoelectric cells are spaced along the floor of the chamber interposed between the driven rollers, and another plurality of like light sensitive devices are spaced on one of the side walls of the chamber, to form light sensitive screens on said floor and side wall, respectively. The photoelectric cells are spaced from each other a distance equal to the increment between classifications, and suitable sources of light are provided continuously to cast a beam on each photoelectric cell, such beams being selectively intercepted by the object or package interposed between the light source and photoelectric cells.

While for measurement of rectangular packages, it would be sufficient to have merely one transverse row and one longitudinal row of photoelectric cells on the floor of the chamber and one vertical row of photoelectric cells on the side wall of the chamber, and opposed sources of light therefor, the arrangement herein showing a plurality of transverse rows of photoelectric cells on the floor of the chamber and a plurality of vertical rows of photoelectric cells on the side wall of the chamber is described to permit determination of the maximum dimensions of a package regardless of its shape.

When the object or package to be classified is in the proper position in the chamber, a circuit is automatically closed from a source of current to the photoelectric cells. The interception of the light beam to some of the photoelectric cells by the interposed objects will thereupon break a circuit to a number of relays controlled by those photoelectric cells to which the beams have been interrupted.

In the case of the transverse rows of cells arranged in longitudinal columns along the floor of the chamber which classify the width of the object, these columns of cells are connected in parallel and each row controls a relay having a switch connected so as to short circuit a corresponding current limiting device or resistance of predetermined value, when the beam to the corresponding photoelectric cell is interrupted. The relay is designed to function only when the entire column of parallel connected cells pass current, so that when an object intercepts the light to any one of said columns of cells the relay will be deenergized for width classification.

In the case of the vertical rows of cells on the side wall of the chamber, each of which cells performs the dual function of controlling both length and height classification of the object or package, each cell has under control thereof a relay having two switches, one for length and one for height classification, each connected so as to short circuit a corresponding current limiting device or resistance of predetermined value when the beam to the corresponding photoelectric cell is interrupted.

According to the invention the resistances are so calibrated that the current, which depends upon the magnitude of resistance remaining in circuit, is proportional to the logarithm of the classification in which the object falls. Three circuits are normally provided to classify the length, height and width, respectively, of the object. By connecting the resistances in each circuit in parallel with each other, and the three parallel resistance circuits in series with a meter, the sum of the currents through said circuits will pass through the meter. Inasmuch as the current through each of said resistance circuits is proportional respectively to the logarithm of the classifications of length, height and width of the object, the meter will pass a current proportional to the sum of such logarithms, so that an anti-logarithmic scale on said meter would indicate the product or volumetric classification directly.

If desired, in order alternately or additionally to indicate one or more individual dimensions, such as the length, the height or the width classification of such object, an appropriate meter with an anti-logarithmic scale may be put in circuit with each of said resistances.

The system of adding logarithmic current values for determining area or volume classification is of utility not only with the optical system of control, but could be used with other systems such as with a system of mechanical switches controlled by engagement with the package or object being classified.

One aspect of the invention for determining the product of a number of factors generally, not limited in anywise to a dimensional classification system, as for instance in a multiplying machine, would involve the use of setting devices or keyboards, one for each factor and current limiting devices such as resistances under control thereof, each resistance so calibrated as to pass a current proportional to the logarithm of the corresponding key or setting value, the product being indicated on a meter taking the combined currents of the resistances and having an anti-logarithmic scale.

In the accompanying drawings in which are shown one or more of various possible embodiments of the several features of the invention, Fig. 1 is a circuit diagram of the equipment, Fig. 2 is a diagrammatic side elevational view of the equipment in cross-section, Fig. 3 is a diagrammatic cross-sectional view thereof taken along line 3—3 of Fig. 2, Fig. 4 is a cross-sectional detail view taken along line 4—4 of Fig. 3, Fig. 5 is a detail cross-sectional view showing the roller drive mechanism, Fig. 6 is a front end view of the equipment, utilizing a tubular lamp for a row of associated photoelectric cells, and Fig. 7 is a diagrammatic end view of the equipment showing the relation of the source of light to the photoelectric cell at the intake and discharge ends of the chamber.

In a preferred embodiment of the invention herein shown, the classification equipment will illustratively be described as suitable for classifying packages in increments of four units up to a maximum length of twenty-four units, height of sixteen units and width of sixteen units. The units may be in centimeters, meters, inches, feet, yards, or any arbitrary unit of length as is desired.

Referring now to Figs. 2 to 7 of the drawings, the equipment comprises a chamber 11 which is essentially a box-like structure open at the intake and discharge ends 12 and 13 thereof respectively, and is mounted on a bed 14 comprising a pair of rails 15 and 16 to which the side walls 17 and 18, respectively, of the chamber 11 are affixed.

In order to feed packages into the intake end 12 of the chamber and remove packages from the discharge end 13 thereof after they have been classified by the device, a conveyor belt system comprising belts 19 and 20 is provided, which system, as it is conventional in construction and forms per se no part of this invention will not be described in detail.

As shown in Figs. 2 and 3, conveyor belt 19 feeds the packages into the intake end 12 of the chamber and conveyor belt 20 transports the packages from the discharge end 13 of the chamber after they have been classified.

Journalled in opposed bearing openings 24 in rails 15 and 16 are the ends of parallel shafts 25 on each of which a roller 26 is keyed. These rollers are distributed along the entire length of the chamber floor 22 and are spaced from each other by intervals no greater than the increments of length to be discriminated and are accommodated in corresponding transverse slots 23 in the floor 22.

The rollers which protrude above the floor 22 to move the packages thereon are driven by suitable means. Illustratively, the protruding extremity 28 of each shaft 25 has affixed thereto a worm gear 29 which coacts with an associated worm 30 keyed on a longitudinal shaft 31 rotatably mounted in brackets 33 at the intake and discharge end of the chamber. Shaft 31 is driven preferably by an electric motor (not shown) simultaneously to rotate shafts 25 and their associated rollers 26 in the same direction to feed towards the discharge end of the chamber.

Affixed to the floor 22 of the chamber between the rollers 26 as at 39 are a plurality of photoelectric cells PC, each of which has an anode and a cathode as do all of the photoelectric cells utilized in this equipment. Each photoelectric cell is positioned with its light sensitive area facing upwardly towards the roof 37 of the chamber through a corresponding opening 38 in the floor 22. The openings 38 in the embodiment herein are spaced four units apart both transversely and longitudinally on the floor 22 to form six transverse rows and four longitudinal rows as shown in Fig. 3.

Similarly a plurality of photoelectric cells PC are mounted on the side wall 18 of the chamber with the light sensitive area of each of the photoelectric cells facing the side wall 17 of the chamber through a corresponding opening 39 in side wall 18. Openings 39 are also spaced four units apart, both vertically and horizontally, and each vertical row of openings is aligned with the transverse row of openings on floor 22 of the chamber to form six vertical rows and four horizontal rows on side wall 18, as shown in Fig. 2.

A source of light is provided on the roof 37 and side wall 17 of the chamber, focused through openings 40 and 41 in said roof and side wall respectively upon the light sensitive area of the opposed photoelectric cells on the floor 22 and side wall 18, through openings 38 and 39, respectively.

In order to concentrate the beams from the source of light upon each of the photoelectric cells so that it will not be affected by extraneous light from the outside, a conventional lens system 40' may be provided which, as it forms per se no part of this invention will not be described.

The source of light for the photoelectric cells may be an individual incandescent lamp 42 for each of the photoelectric cells, as shown in Figs. 2 and 4, or a tubular lamp such as a fluorescent lamp 43 may be used for each row of photoelectric cells, as illustratively shown in Fig. 6. Each type of lamp has certain advantages and disadvantages. The individual lamps consume more current than the tubular lamp and dissipate a greater amount of heat. However, they give off much more light and where there is a relatively large distance between the walls of the chamber, as for example, when the device is of size to classify relatively large objects, this may be a deciding factor.

In addition to the photoelectric cells on the floor 22 of the chamber which classify the width of the package, and those on the side wall 18 which classify the length and height of the package in the manner hereinafter more fully described, three other photoelectric cells PC-1, PC-2 and PC-3 with their associated source of light 42ª, 42ᵇ and 42ᶜ respectively, are provided.

Photoelectric cells PC-1 and PC-2 are positioned side by side upon the equipment at the discharge end 13 thereof to one side of conveyor belt 20 with the light sensitive area thereof immediately above the floor 22 of the chamber. Photoelectric cells PC-1 is positioned exactly four units to the rear of the rearmost transverse row of photoelectric cells on the floor 22 of the chamber and photoelectric cell PC-2 is spaced immediately to the rear of photoelectric cell PC-1. Photoelectric cell PC-3 is positioned upon the equipment at the intake 12 thereof on one side of conveyor belt 19 with its light sensitive area immediately above floor 22.

The sources of light or lamps 42ª, 42ᵇ and 42ᶜ for the photoelectric cells PC-1, PC-2 and PC-3, respectively, at one side of the equipment are positioned thereon on the opposite side thereof to cast a beam on the light sensitive area of their associated photoelectric cells so that the leading edge of a package moved into the chamber by the conveyor belt 19 will first interrupt the beam of light to photoelectric cell PC-3 and then as the package is moved through the chamber, interrupt the beams of light to photoelectric cells PC-1 and PC-2.

In order that the beams of light to photoelectric cells PC-1, PC-2 and PC-3 may be interrupted by the extremity of the package no matter how small or where relative to the bottom or side wall of the chamber that end may be located, a system of reflector mirrors M is provided. As shown in Fig. 7, a plurality of mirrors are arranged in vertical transversely aligned rows on each side of the equipment, in substantially the transverse plane common to the associated photoelectric cell and its source of light. The mirrors of each aligned row are so tilted that the beam from the source of light on the top of the equipment will be reflected in a zig zag course across the corresponding end of the chamber until it impinges upon the light sensitive area of the associated photoelectric cell on the floor of the equipment.

Photoelectric cell PC-1 controls the starting relay R-1. Photoelectric cell PC-2 controls the holding relay R-2 and photoelectric cell PC-3 controls the clearing relay R-3 in the manner hereinafter set forth.

The classifications of length and height and of width discriminated by the photoelectric cells on the side wall 17 and floor 22, respectively, of the chamber and the corresponding product of such three classifications are indicated as a volumetric classification on a meter M—V. Preferably three other meters M—L, M—H and M—W are also provided in the length, height and width circuits respectively so as to give a visual indication of the length, height and width classifications. For convenience the four meters may be assembled on one meter bank.

Associated with said photoelectric cells PC and meters M—L, M—H, M—W and M—V are a plurality of variable resistor banks RB-1, RB-2 and RB-3 and a plurality of relays R, which are located in a control box (not shown) preferably situated in any convenient place away from the chamber proper.

The circuit for said photoelectric cells, relays, resistor banks and meters will now be described in detail. With reference to Fig. 1, the circuit is shown as comprising essentially three main sections, i. e., section I for the control units, section II for the side wall units that classify length and height, and section III for the floor and roof units that classify width.

Neither the source of light heretofore described for each photoelectric cell nor its wiring connections is shown in Fig. 1 in order that the explanation of the circuit may be simplified.

In section I, three relays are shown, including the starting relay R-1, the holding relay R-2 and the clearing relay R-3, each with its associated photoelectric cell PC-1, PC-2 and PC-3, respectively.

In section II twenty-four relays R are illustratively shown, each with its associated photoelectric cell PC. Each relay R in section II has three pairs of contacts, one pair being open while the other two pairs are closed and vice versa. The first pair of contacts designated H—C controls the holding circuit for the relay, the next pair of contacts designated C—L controls the length classification, and the third pair of contacts designated C—H controls the height classification. Associated with the group of contacts designated C—L is a series connected length resistor bank RB-1 having seven sections R*l*-1 to R*l*-7 inclusive and with the group of contacts designated C—H is a series connnected height resistor bank RB-2 having five sections R$h$-1 to R$h$-5 inclusive. Meter M—L is connected in series with resistor bank RB-1 and meter M—H is connected in series with resistor bank RB-1 and meter M—H is connected in series with resistor bank RB-2.

In section III twenty-four photoelectric cells PC are also shown arranged in four banks each with six photoelectric cells. A relay R is provided in series with each bank. Each relay in this section has two pairs of contacts, one pair being open while the other pair is closed and vice versa. The pair of contacts designated H—C controls the holding circuit for the relay and the other pair of contacts designated C—W controls the width classification. Associated with the group of contacts designated C—W is a series connected resistor bank RB-3 with five sections R$w$-1 to R$w$-5 inclusive together with meter M—W in series therewith.

The cathode $c$ of each of the three photoelectric cells of section I is connected by way of common lead 61 and leads 62 and 63 to contact 64 of on-off switch SW-1, contact 65 of which is connected to negative main N. The anode $a$ of each of said three photoelectric cells is connected to the coils of relays R-1, R-2 and R-3 by leads 66, 67 and 68, respectively, the free end of each of the coils being joined by a common lead 69 which is connected to positive main P by lead 72.

The movable contact 82 of starting relay R-1 and fixed contact 83 of clearing relay R-3 are connected by leads 84 and 85, respectively, to lead 77 and thence to negative main N. Fixed contact 86 of relay R-1 is connected by leads 87, 88, 89, 90, 91 and 92 to the cathodes of all the photoelectric cells in section II and by leads 87, 93, 94, 95, 96 and 97 to the cathodes of all the photoelectric cells in section III.

The holding relay R-2 has a fixed contact 73 which is connected by a lead 74 to lead 66, and a movable contact 76 which is connected by lead 77′ to lead 77 and thence to contact 78 of on-off switch SW-2. Contact 79 of said switch is connected by lead 81 to contact 64 of switch SW-1, thereby placing the two switches SW-1 and SW-2 in series with negative main N.

The movable contact 98 of clearing relay R-3 is connected by leads 99, 100 and 101 to the fixed contacts 102 of each of the holding circuit contacts H—C in section III. Each of the fixed contacts 102 has an associated movable contact 106, the latter being connected by lead 110 to one end of the coil of the corresponding relay R.

Similarly movable contact 98 of relay R-3 is connected by leads 99, 114, 115, 116, 117 and 118 and by leads 99, 100, 119, 120, 121 and 122 to the fixed contacts 123 of the holding circuit contacts H—C in section II. Each of the fixed contacts 123 has an associated movable contact 124, the latter being connected by lead 125 to one end of the coil of the corresponding relay R.

As the individual circuits for the relays in section II are identical as are the individual circuits for the relays in section III, only one relay in section II and one relay in section III designated R-4 and R-5, respectively, together with the associated circuits therefor, including photoelectric cells PC-4 and PC-5, respectively, will be described in detail.

Referring now to the photoelectric cell PC-4 in section II, the anode 128 thereof is connected by lead 129 to the end of the coil of relay R-4. Contacts C—L of relay R-4, which control the length classification, comprise fixed contact 130 and movable contact 131. The former is connected by leads 132, 133, 134, 135 and 72 to positive main P and by leads 132, 133 and 136 to one end of resistor bank RB-1 as at 137. Movable contact 131 is connected by lead 138 to the end of resistor section R$l$-1 as at 139. The end 140 of resistor bank RB-1 is connected by lead 141 to meter M—L as at 142.

Contacts C—H of relay R-4, which control the height classification, comprise fixed contact 148 and movable contact 149. The former is connected by leads 150, 133, and 134 to one end of resistor bank RB-2 as at 152 and thence by leads 135 and 72 to positive main P. Movable contact 149 is connected by leads 153, 154 and 155 to the end of resistor section R$h$-1 as at 156. The end 157 of resistor bank RB-2 is connected by lead 158 to meter M—H as at 159.

The photoelectric cells PC in section III which are on the floor of the classifying chamber are arranged in four banks or columns, each having six parallel connected photoelectric cells, the cathodes of each of said photoelectric cells being connected, as heretofore set forth, to fixed contact 86 of starting relay R-1. The anode of each of said photoelectric cells is connected to its respective relay R, as for instance by common lead 161 from the photoelectric cell PC-5 in section III to one end of the coil of relay R-5. The other end of the coil relay R-5 is connected by leads 168, 135 and 72 to positive main P.

As each bank of photoelectric cells in section III is connected in parallel, the total current of all six photoelectric cells in the bank passes through the coil of the associated relay and as the relays are so designed that it requires the total current through each parallel bank of photoelectric cells to keep the relay energized, if any one photoelectric cell in a bank should be deenergized, the relay associated with the bank is likewise deenergized.

Contacts C—W of relay R-5 which control the width classification comprise fixed contact 169 and movable contact 171. The former is connected by leads 172, 135 and 72 to positive main P and by leads 172, 135 and 174 to one end of resistor bank RB-3 as at 175. Movable contact 171 is connected by lead 176 to the end of resistor section R$w$-1 as at 177 and the end 178 of resistor bank RB-3 is connected by lead 179 to meter M—W as at 181.

By means of a common lead 144 the previously unconnected terminals of the meters M—L, M—H and M—W are connected and lead 144 is connected to a fourth meter M—V, as at 145. Thus the three meters M—L, M—H and M—W are connected in parallel with each other and in series with meter M—V, the latter being connected to negative main N by leads 147 and 63.

The photoelectric cells PC herein may be of the type that do not require a separate amplifier, or photoelectric cells may be used which require an electronic amplifier. In the latter case, as conventional amplifier circuits will be used, they will not be shown or described, it being deemed sufficient to mention that the electronic amplifiers, if used, are preferably mounted in the control box (not shown) along with the relays and resistor banks.

*Calculation of the values of the circuit components*

As has been heretofore described, a meter is placed in series with each of the resistor banks and these three meters are in parallel with each other and in series with a fourth meter which will thus indicate the sum of the currents flowing through the first three meters. The scales of the meters are preferably calibrated to read the classification rather than the current therethrough. If the current passed through each of the three parallel-connected meters is proportional to the logarithm of the corresponding dimension classification, the sum of said currents is passed through the fourth and series connected meter which latter is calibrated to read the anti-logarithm of such current value, that is, the product of the three dimensions or the volume classification of the package.

In calculating the value of the resistor sections in the length, height and width resistor banks RB-1, RB-2 and RB-3 respectively, it will be assumed that 110 volts direct current will be utilized, although it is to be understood that alternating current could be used and the potential applied may be more or less than 110 volts.

It will also be assumed that the increment of classification is four units and that the chamber will be of sufficient size to classify objects no more than twenty-four units long by sixteen units high and sixteen units wide. Thus there are six increments of length, four of height and four of width.

Each resistor bank is provided with a section of fixed value for each of the dimensions that it classifies and an additional section to provide for a zero reference point, as will be more fully described hereinafter. Thus there will be seven resistor sections in the length resistor bank and five resistor sections in each of the height and width resistor banks.

To illustrate the foregoing, the logarithm (to two decimal places) of the successive illustrative increments of four are

| Classification | Logarithm |
|---|---|
| 4 | .60 |
| 8 | .90 |
| 12 | 1.08 |
| 16 | 1.20 |
| 20 | 1.30 |
| 24 | 1.38 |

The currents passed through the respective length, height and width meters for the various classifications are to be proportional to the respective logarithms noted and for convenience a multiplication factor of 100 is introduced to give a current reading in milliamperes. Thus the currents corresponding to the foregoing will be:

| Classification | Logarithms | Current in Milliamperes |
|---|---|---|
| 4 | .60 | 60 |
| 8 | .90 | 90 |
| 12 | 1.08 | 108 |
| 16 | 1.20 | 120 |
| 20 | 1.30 | 130 |
| 24 | 1.38 | 138 |

In order for the meter M—L which is calibrated in increments of four units to show a reading of four, a current flow of 60 ma. would be required in the associated circuit.

The ohmage of the resistance to produce such current of 60 ma. is readily calculated as follows:

$$R = \frac{E}{I} = \frac{110 \text{ (volts)}}{.06 \text{ (amperes)}} = 1833 \text{ (ohms)}$$

Thus for a reading of four, the circuit should have a resistance of 1833 ohms.

Similarly the chart may be continued as follows:

| Classification | Logarithm | Current in Milliamperes | Resistance in Ohms Required in Circuit |
|---|---|---|---|
| 4 | .60 | 60 | 1,833 |
| 8 | .90 | 90 | 1,222 |
| 12 | 1.08 | 108 | 1,019 |
| 16 | 1.20 | 120 | 917 |
| 20 | 1.30 | 130 | 845 |
| 24 | 1.38 | 138 | 797 |

For the zero reference point on the meter, a higher resistance value is chosen to give a relatively small current indication. In the embodiment herein, a current indication of 11 ma. has been arbitrarily selected as the zero point, so that the resistance required in the circuit to give this indication is 10,000 ohms.

Thus the resistance of all seven series connected sections of the length resistor bank RB-1 is 10,000 ohms. When the first of said sections $Rl-1$ is short circuited in the manner hereinafter described, by a package in the chamber having a length within the lowest classification of four units, 1833 ohms must remain in the circuit. Therefore, resistor section $Rl-1$ which alone is short circuited in the length resistor bank has a resistance of $10,000 - 1833 = 8167$ ohms.

Calculating the value of resistor sections $Rl-2$ which is short circuited by a package in the second classification of length, that is, of eight units, in order to give the required current indication of 90 ma., it would be necessary as above shown to have 1222 ohms in the circuit. However, as we have already removed 8167 ohms by short circuiting resistor $Rl-1$, it is only necessary to remove 611 ohms more to have the desired resistance in the circuit and hence the value of $Rl-2$ is 611 ohms.

Continuing these calculations, the value of resistor sections $Rl-1$ to $Rl-6$ are as follows:

| Resistor Section | Value in Ohms |
|---|---|
| $Rl-1$ | 8,167 |
| $Rl-2$ | 611 |
| $Rl-3$ | 203 |
| $Rl-4$ | 102 |
| $Rl-5$ | 72 |
| $Rl-6$ | 45 |

The calculation of the values of $Rh-1$ to $Rh-4$ and $Rw-1$ to $Rw-4$ in the height and width resistor banks, inasmuch as the units between classifications is also equal to four, is done in the same manner as above set forth and $Rh-1$ to $Rh-4$ inclusive, and $Rw-1$ to $Rw-4$ inclusive, will equal 8167 ohms, 611 ohms, 203 ohms and 102 ohms, respectively.

The value of $Rl-7$, $Rh-5$ and $Rw-5$ may be ascertained directly from the chart by reading therefrom the resistance required to give a reading of 24 units in length, 16 units in height and 16 units in width. Thus the value of resistors $Rl-7$, $Rh-5$ and $Rw-5$ are found to be 797 ohms, 917 ohms and 917 ohms, respectively.

*Operation*

To illustrate the operation of the equipment, it will be considered as classifying a package illustratively four units long, four units high and four units wide.

The light switch (not shown) is closed to turn on all the lights. Manual switch SW-1 is then closed as shown in Fig. 1, which connects main N to the cathodes of the photoelectric cells PC-1, PC-2 and PC-3 in section I. These photoelectric cells therefore become energized through leads 66, 67 and 68 and the coils of relays R-1, R-2 and R-3, leads 69 and 72 to positive main P. The normally closed contacts 82, 86 and 73, 76 of relays R-1 and R-2 respectively, open and the normally open contacts 83, 98 of relay R-3 will now close, as shown in Fig. 1.

As the holding contacts H—C of sections II and III are normally open and the contacts C—L, C—H and C—W are normally closed as shown, and as there is no negative potential on the cathodes of any of the photoelectric cells in sections II and III, inasmuch as switch SW-2 is open, resistor sections $Rl$-1 to $Rl$-6 inclusive, $Rh$-1 to $Rh$-4 inclusive, and $Rw$-1 to $Rw$-4 inclusive will remain short circuited and meter M—L will register only the current flowing through resistor $Rl$-7 which is equal to 138 milliamperes and meters M—H and M—W will read only the current through resistors $Rh$-5 and $Rw$-5 respectively, which in each case is equal to 120 milliamperes. Meter M—V, as it is in series with the parallel connected meters M—L, M—H and M—W will pass therethrough the sum of the currents, i. e., 378 ma., the anti-logarithm of which is 6144, the maximum volume, capable of being classified by equipment of the size herein illustrated and as this value is indicated when the device is initially turned on without a package in the measuring chamber, it is also designated zero.

Manual switch SW-2 is then closed, completing a circuit to the fixed contacts of all the holding circuits H—C in section II from negative main N, switch SW-1, lead 81, switch SW-2, leads 77, 85, closed contacts 83 and 98 of relay R-3 and leads 99, 114, 115, 116, 117, 118 and leads 119, 120, 121 and 122, and to the fixed contacts of all the holding circuits in section III through leads 99, 100 and 101.

A package with the dimensions heretofore set forth is placed in conveyor belt 19 so as to abut against the guide rail 21 thereof which is positioned adjacent one edge of conveyor belt 19 and aligned with side wall 18 of the chamber. When the package reaches the intake end 12 of the chamber, it will intercept the light from photoelectric cell PC-3 and thereby break the circuit to holding relay R-3. Contacts 83 and 98 thereof will therefore separate, breaking the negative potential upon the fixed contact of the pair H—C in sections II and III. However, in the case of the first package, none of these holding contacts H—C will have been closed and nothing will be affected at this point. Further motion of conveyor belt 19 will deliver the package to the rollers 26 in the chamber 11 and as the package advances, it will intercept the light to the photoelectric cells PC. However, as none of the photoelectric cells PC is energized, inasmuch as contacts 82 and 86 of relay R-1 in section I are open, and there is no negative potential on the cathodes of said cells PC, none of the relays in sections II and III will be energized.

When the package reaches the discharge end 13 of the chamber, it will intercept the light to photoelectric cell PC-1, thereby deenergizing the latter and its associated relay R-1 so that the contacts 82 and 86 thereof will close, connecting the cathode of each of the photoelectric cells PC in sections II and III to negative main N through switch SW-1, lead 81, switch SW-2, lead 77, 84, contacts 82 and 86 and lead 87. The circuit to section II is from lead 87 to leads 88, 89, 90, 91 and 92. The circuit to section III is from said lead 87 to lead 93, 94, 95, 96 and 97. All the relays in sections II and III will thus be energized except relays R-4 and R-5, since photoelectric cells PC-4 and PC-5 in sections II and III respectively have had the light thereto intercepted by the package. With all the relays except the two above indicated energized, all the holding circuit contacts H—C will close except those of relays R-4 and R-5 and as clearing relay R-3 had again been energized when the entire package had entered the chamber, contacts 83, 98 thereof reclosed, connecting negative main N to the fixed point of all the holding circuit contacts H—C. Thus each energized relay (that is all those except R-4 and R-5) will have a holding circuit around the coil thereof and thereby remain energized. Accordingly, all the contacts C—L, C—H and C—W will be open, except only those under control of deenergized relays R-4 and R-5, that is, contacts 130, 131 and 148, 149 of relay R-4 and contacts 169, 171 of relay R-5. All the short circuits around the resistor sections will thus be removed except only the short circuit around resistor section $Rl$-1 completed by contacts 130, 131, that around resistor section $Rh$-1 completed by contacts 148, 149, and that around resistor section $Rw$-1 completed by contacts 169, 171.

Meters M—L, M—H and M—W will, therefore, register the current flowing through the length, height and width resistor banks RB-1, RB-2 and RB-3, respectively, each of which has 1827 ohms in circuit therewith and thus the reading on each of the meters will be four (4) units. Meter M—V will carry the sum of the currents flowing through the said aforementioned three meters and will read 64 volume units.

As the package protrudes beyond the discharge end of the chamber and its advance end is deposited upon conveyor belt 20, it intercepts the light to photoelectric cell PC-2 and de-energizes holding relay R-2, thereby causing the contacts 73, 76 thereof to close. This completes the circuit from the negative main N through switch SW-1, lead 81, switch SW-2, lead 77, contacts 76 and 73, lead 74 to lead 66 through the coil of relay R-1, leads 69 and 72 to positive main P. The coil of relay R-1 is thus energized and the contacts 82 and 86 thereof are opened to break the circuit from negative main N to the cathodes of all the photoelectric cells in sections II and III. However, as the holding circuits H—C remain on all the relays (except relays R-4 and R-5 which indicate the length, height and width classification of the package just rated), the classification readings will remain on the meters until the next package to be classified intercepts the light to clearing relay R-3 at the intake end of the chamber, thereby breaking the circuit from the negative main N to the fixed point of the holding contacts H—C of each of said relays and again short circuiting all of the resistor sections in the length, height and width resistor banks to prepare the circuit for the classification of the next package.

Thus by the use of the device herein described, it is a relatively simple matter to classify objects or packages no matter how irregular their shape, according to the maximum length, height, width and volume thereof without fuss or bother. It is merely necessary for a checker to look at the meters, instantly to determine the classification of the package passed through the chamber.

If it is desired to allow packages below a predetermined volume to pass and to stop or reject packages above this predetermined volume, an alarm bell, lamp or ejector can be put into the circuit, to be energized when the current flow becomes greater than that corresponding to the maximum permissible volume.

It is to be understood that although the photoelectric cells are illustratively shown on the floor of the device to classify width and on one of the side walls of the device to classify length and height, they could be arranged so that the photoelectric cells on the floor classify both width and length and those on the side wall classify only height. If the area of the object as for instance a flat object such as a skin or pelt is desired, only one set of photoelectric cells would be required on the floor of the device with opposed source of light therefor to respond to length and width, the meter reading the area classification as the anti-logarithm of the combined currents.

Obviously, the position of any or all of the lights and the photoelectric cells could be reversed, it being important only that each photoelectric cell has an opposed source of light to cast a beam thereon.

It is also obvious that although the contacts C—L, C—H and C—W controlling the length, height and width classifications, respectively, are normally closed, some or all of them could be normally open and their related circuits arranged so that the desired current indication would be given when the leading edge of the interposed object intercepts the beam from the light 42ª to photoelectric cell PC-1 controlling starting relay R-1.

While the circuits herein utilize resistances arranged to determine the current indications, it is within the scope of the invention from its broader aspects to arrange the circuits to give voltage indications or to use circuits employing any suitable combination of resistances, capacitances or inductances.

The construction and method herein shown and described will serve to classify objects or packages regardless of their shape, but the system may be greatly simplified if only rectangular packages are to be classified. In such case, it would be sufficient to provide light sensitive means arranged merely linearly along each axis of the three dimensional system of rectangular coordinates, each light sensitive means serving to classify the corresponding dimension when the edges of the object or package extend along said axes. The drastic simplification of the above described circuit for such greatly simplified system and method will be apparent to those skilled in the art.

While area or volume classification is preferably effected by the addition of logarithmic current values governed by an optical system controlled by the package, as above described, such optical system could, within the scope of the invention, be combined with other methods or equipment for effecting the necessary multiplication for area or volume classification.

The addition of logarithmic current values for area or volume classification is not limited for use in combination with such optical system, but may be used with other systems such as for instance a system of switches mechanically controlled by engagement with the package or article being classified.

The multiplication by addition of logarithmic current values, according to the present invention, is not limited in its application to, but has a broader field of utility wholly apart from systems and equipment effecting dimensional classification.

It could, by way of example, be used for the purpose of ascertaining the product of any number of factors, illustratively for a multiplying machine. In a practical embodiment such machine might have as many keyboards as there are factors to be multiplied, each keyboard having a current limiting device such as a resistance under control thereof, calibrated to pass a current proportional to the logarithm of the operated key value and a meter taking the combined current due to the various operated keys, said meter having an anti-logarithmic scale which thus reads the product of the combined current values passed due to the depression of the keys on the several keyboards, thereby showing the product of the numerical values of the operated keys.

Although one specific embodiment of the invention, as used for classification purposes, has been described hereinabove, it will of course be understood that it is within the scope of the invention from its broader aspects to arrange the electric circuits, meters and other components in accordance with the principles of the foregoing teachings, so that the equipment may be adapted for classification purposes in any of a wide variety of industries or businesses, according to the particular requirements thereof, to classify objects according to whatever function of length, width, height, shape, contour, or the like, becomes material as the basis of classification for the purpose in hand.

One of the multiplicity of specialized uses to which the invention lends itself is in the United States Post Office which sets a limit for the combined girth and length of a package acceptable for parcel post delivery. The resistances under control of the photoelectric cells that classify height and width could be calibrated to pass a current proportional to twice the respective dimensions, while the final meter that passes the combined current could be calibrated to indicate the same, that is, the sum of twice the width, twice the height and the length. For such purpose, there is no multiplication and the logarithmic principle would not be used. An alarm or the like could be used to indicate or reject a package oversized according to Post Office standards.

As many changes could be made in the above method and equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention what I claim as new and desire to secure by Letters Patent of the United States is:

1. A dimensional classification equipment for classifying a sequence of objects comprising a plurality of light sensitive cells, associated sources of light opposed to said cells and spaced therefrom to cast beams of light on said cells whereby beams may be interrupted according to the dimensions of an interposed object, a plurality of current limiting means, means for applying a source of current to said current limiting means, said current limiting means each having an ohmic value calibrated so that the current therethrough may be proportional to the logarithm of a predetermined dimensional value, a plurality of switches in circuit with said light sensitive cells and actuated thereby, said switches being operatively connected to said plurality of current limiting means to vary the resistance thereof in accordance with those cells to which the beam is interrupted by such interposed object, an indicating device in circuit with said current limiting means to indicate said classification, and circuit means for said switches to maintain the latter in actuated condition thereby to retain the classification indication of such interposed object on said indicating device.

2. The combination set forth in claim 1 in which means are provided to interrupt the circuit means to deactuate said switches, thereby clearing said classification indication, said means being controlled by the next object to be classified.

3. A dimensional classification equipment comprising a chamber having an intake end and a discharge end, a source of current, a plurality of de-energized light sensitive cells, normally open circuits connecting said cells to said source of current, a plurality of normally deenergized current operated switch means associated with said cells and controlled thereby, circuits connecting said switch means and said cells and opposed sources of light on the side walls of said chamber and on the roof and floor of said chamber to permit interposition of a light intercepting object between said cells and the opposed sources of light therefor whereby the beam of light to said cells may be interrupted correlated with the length, height and width of the light intercepting object, means to convey such object into the intake end of said chamber, means to move said object through said chamber, means to convey said object away from the discharge end of said chamber, a light sensitive cell and opposed source of light therefor at the discharge end of said chamber to permit interposition of said object therebetween, means under control of said light sensitive cell when the leading edge of such object intercepts the light from said source of light to said light sensitive cell to complete the circuit to said plurality of light sensitive cells and energize all of said cells whereby current will flow through all of said cells except those to which the beams are interrupted by said interposed object, and energize all of said switch means except those controlled by the cells to which the beams are interrupted, current limiting means controlled by said switch means for passing a current correlated with the length, height and width respectively of such object, and a meter in circuit with said current limiting means to indicate the total value of the current therethrough.

4. An equipment for classifying the length, height and width of an object and for determining the product of said classifications, said equipment comprising a source of current, a chamber, a plurality of de-energized light sensitive cells, normally open circuits connecting said cells to said source of current, means to close said normally open circuits to energize said cells, opposed sources of light for said cells on the walls of said chamber and on the roof and floor of said chamber to permit interposition of a light intercepting object between said cells and the opposed sources of light therefor, whereby the beams of light to said cells may be interrupted and current may pass through all of said cells except those to which the beams are interrupted, said cells and said lights on each of the walls and on the floor and roof of said chamber being spaced from each other a distance equal to predetermined increments of length, width and height, a plurality of resistance banks each having a plurality of series connected sections each of predetermined resistance related to the dimension being classified, circuits connecting said resistor banks to a source of current, means actuated by said light sensitive cells to which the beam is interrupted to short circuit one or more sections of each of said resistance banks so that the total ohmic value of the remaining sections will pass a current proportional to the logarithm of the dimension related to the cell to which the beam is interrupted, and a meter in series with said resistance banks to indicate the sum of the currents therethrough, said meter having an anti-logarithmic scale to indicate the product of the dimensions being classified.

5. A dimensional classification equipment comprising a chamber, two sets of light sensitive cells in planes substantially at right angles to each other and normally open circuits connecting said cells to a source of current, sources of light opposed to the respective sets of light sensitive cells, whereby said light casts beams on said cells to be interrupted by an object interposed between said cells and a source of light, means to complete the circuit to said light sensitive cells and energize all of said cells whereby current will pass through all of said cells except those to which said beams are interrupted, a plurality of relays in circuit with each of said sets of light sensitive cells and controlled thereby, a variable resistance bank controlled by those relays in circuit with one of said sets of light sensitive cells, and a pair of variable resistance banks controlled by those relays in circuit with the other of said sets of light sensitive cells, each of said relays having means to change the ohmic value of said associated resistance banks a predetermined amount, circuits connecting said variable resistance banks to a source of current, said resistance banks passing a current correlated with those cells to which the beam is interrupted by said interposed object, and a meter in circuit with said resistance banks to indicate the combined currents therethrough.

6. The combination set forth in claim 5 in which the means to complete the circuit to said light sensitive cells comprises a light sensitive cell, a circuit connecting said cell to a source of current and a source of light opposed to said cell and spaced therefrom, whereby said light casts a beam on said cell to be interrupted by said interposed object, the normally open circuits from said sets of light sensitive cells to such source of current including a normally open switch, current actuated means to operate said switch, said means being in circuit with said single light sensitive cell and controlled thereby.

7. The combination set forth in claim 5 in which means are provided to interrupt the circuit to said light sensitive cells and de-energize the same while still retaining the readings on said meter.

8. The combination set forth in claim 5 in which said chamber has an intake end and a discharge end and conveyor means are provided at the intake end and at the discharge end of said chamber respectively to introduce an object into said chamber and to move it away from said chamber.

9. The combination set forth in claim 5 in which means are provided to move a package through said chamber.

10. A dimensional classification equipment comprising a chamber having an intake end and a discharge end, a plurality of light sensitive cells, normally open circuits connecting said cells to a source of current, opposed sources of light for said cells on the roof and floor of said chamber, whereby said light casts beams on said cells to be interrupted by an object interposed between said cells and said sources of light, a plurality of relays in circuit with said light sensitive cells and controlled thereby, each of said relays having two pairs of contacts, a variable resistance bank having a plurality of series connected sections and a holding circuit for said relays both under control of said two pairs of contacts, a plurality of light sensitive cells, normally open circuits connecting said cells to a source of current, opposed sources of light therefor on the walls of said chamber whereby said light casts beams on said cells to be interrupted by such interposed object, a plurality of relays in circuit with said light sensitive cells and controlled thereby, each of said relays having three pairs of contacts, a pair of variable resistance banks each having a plurality of series connected sections and a holding circuit for said relays both under control of said three pairs of contacts, means to close the normally open circuits for all of said cells to energize the latter whereby current may pass through all of said cells except those to which the beams are interrupted and whereby all of the relays in circuit with the cells through which current is flowing will be energized circuits connecting said resistor banks to a source of current, each of said series connected sections having an ohmic value related to the value of the dimension being classified, one pair of contacts of each of said first named plurality of relays and two pairs of contacts of each of said second named plurality of relays being connected to said series connected sections of said three resistance banks to short circuit one or more sections of each of said resistance banks correlated with those cells to which the beams are interrupted, so that the total ohmic value of the remaining sections of each of said banks will pass a current proportional to the logarithm of the dimension related to the cells to which the beams are interrupted, and a meter in series with said resistance banks to indicate the sum of the currents therethrough, said meter having an anti-logarithmic scale to indicate the product of the dimensions being classified.

11. The combination set forth in claim 10 in which a meter is provided in series with each of said resistance banks to indicate the current therethrough, and said meters are connected in parallel with each other and in series with said fourth meter.

12. A dimensional classification equipment comprising, a chamber, a plurality of rows of parallel connected light sensitive cells on the floor of said chamber, opposed sources of light therefor, a relay connected in series with each row of light sensitive cells and controlled thereby, said relays each having two pairs of contacts, a resistance bank having a plurality of series connected sections, each section under control of one of said pairs of contacts of each of said relays, and a holding circuit for each of said relays under control of the other pair of said contacts, a plurality of rows of light sensitive cells on the walls of said chamber, opposed sources of light therefor, a relay connected in series with each of said light sensitive cells and controlled thereby, said relays each having three pairs of contacts, a pair of resistance banks each having a plurality of series connected sections, the sections of each of said banks being under control respectively of one of the pairs of said two pairs of contacts of each of said relays, and a holding circuit for each of said relays under control of the third pair of said contacts, normally open circuits connecting said light sensitive cells to a source of current, means to close the normally open circuits for all of said cells to energize the latter whereby current may pass through all of said cells except those to which the beams are interrupted by an object interposed between said cells and said source of light therefor, and whereby all of the relays in circuit with the cells through which current is flowing will be energized, circuits connecting said resistance banks to a source of current, each of said series connected sections having an ohmic value related to the value of the dimensions being classified, one pair of contacts of each of said first named plurality of relays and two pairs of contacts of each of said second named plurality of relays being connected to said series connected sections of said three resistance banks to short circuit one or more sections of each of said resistance banks correlated with those cells to which the beams are interrupted, so that the total ohmic value of the remaining sections of each of said banks will pass a current proportional to the logarithm of the dimension related to the cells to which the beams are interrupted, a meter in series with said resistance banks to indicate the sum of the currents therethrough, said meter having an anti-logarithmic scale to indicate the product of the dimensions being classified, and means to interrupt said holding circuits to clear said meter.

13. An equipment for ascertaining at least two of the dimensions of an object and for determining the product of said dimensions, said equipment comprising a frame to carry such object, switch means associated with said frame and arranged along the two axes of a system of rectangular coordinates related to said two dimensions of the object being measured, the switch means along each of such axes being spaced by a distance equal to predetermined increments of the dimensions being measured, means coacting with such object to actuate the switch means correlated with the dimensions of the object, resistor banks coacting with the switch along said two axes, each of said resistor banks having a plurality of resistors, each of predetermined value so related to the value of the dimension being measured that the current through said resistor bank will be proportional to the logarithm of said value, and an indicating device in circuit with said resistor banks to indicate the combined currents flowing therethrough.

14. An equipment for classifying the length, height and width of an object, and for determining the product of said classification, said equipment comprising a frame to carry such object, switch means associated with said frame and arranged along each axis of a three dimensional system of rectangular coordinates, the switch means on each of such axes being spaced by a distance equal to predetermined increments of length, height and width, means coacting with such object to actuate the switch means correlated with the dimensions of the object, a resistor bank associated with each of the switch means along each axis of said three dimensional system, each of said resistor banks having a plurality of resistors each of predetermined value so related to the value of the dimension being measured that the current through said resistors will be proportional to the logarithm of said value, and an indicating device in circuit with said resistor banks to indicate the combined current flowing therethrough.

15. The combination set forth in claim 14 in which said indicating device has an anti-logarithmic scale to indicate the combined current therethrough as the product of the length, width and height of such object.

EMIL KOLISCH.

REFERENCES CITED

The following references are of record in the file of this patent:

UNITED STATES PATENTS

| Number | Name | Date |
|---|---|---|
| 1,573,850 | Naiman | Feb. 23, 1926 |
| 1,827,786 | Gilson | Oct. 20, 1931 |
| 1,940,882 | Rich | Dec. 26, 1933 |
| 1,992,869 | Krell | Feb. 26, 1935 |
| 2,049,540 | Hart | Aug. 4, 1936 |
| 2,070,178 | Pottenger et al. | Feb. 9, 1937 |
| 2,085,671 | Powers | June 29, 1937 |
| 2,149,958 | Fox | Mar. 7, 1939 |
| 2,171,362 | Gulliksen | Aug. 29, 1939 |
| 2,244,369 | Martin | June 3, 1941 |
| 2,302,025 | Gould | Nov. 17, 1942 |
| 2,310,438 | Johnsen | Nov. 9, 1943 |
| 2,346,031 | Jones et al. | Apr. 4, 1944 |
| 2,362,004 | Heidinger | Nov. 7, 1944 |
| 2,447,024 | Metcalf | Aug. 17, 1948 |
| 2,458,697 | Fensake | Jan. 11, 1949 |